July 5, 1932. S. J. CLARIDGE 1,865,834
ELECTRICALLY HEATED HANDLE FOR VEHICLES AND OTHER PURPOSES
Filed April 19, 1930 2 Sheets-Sheet 2
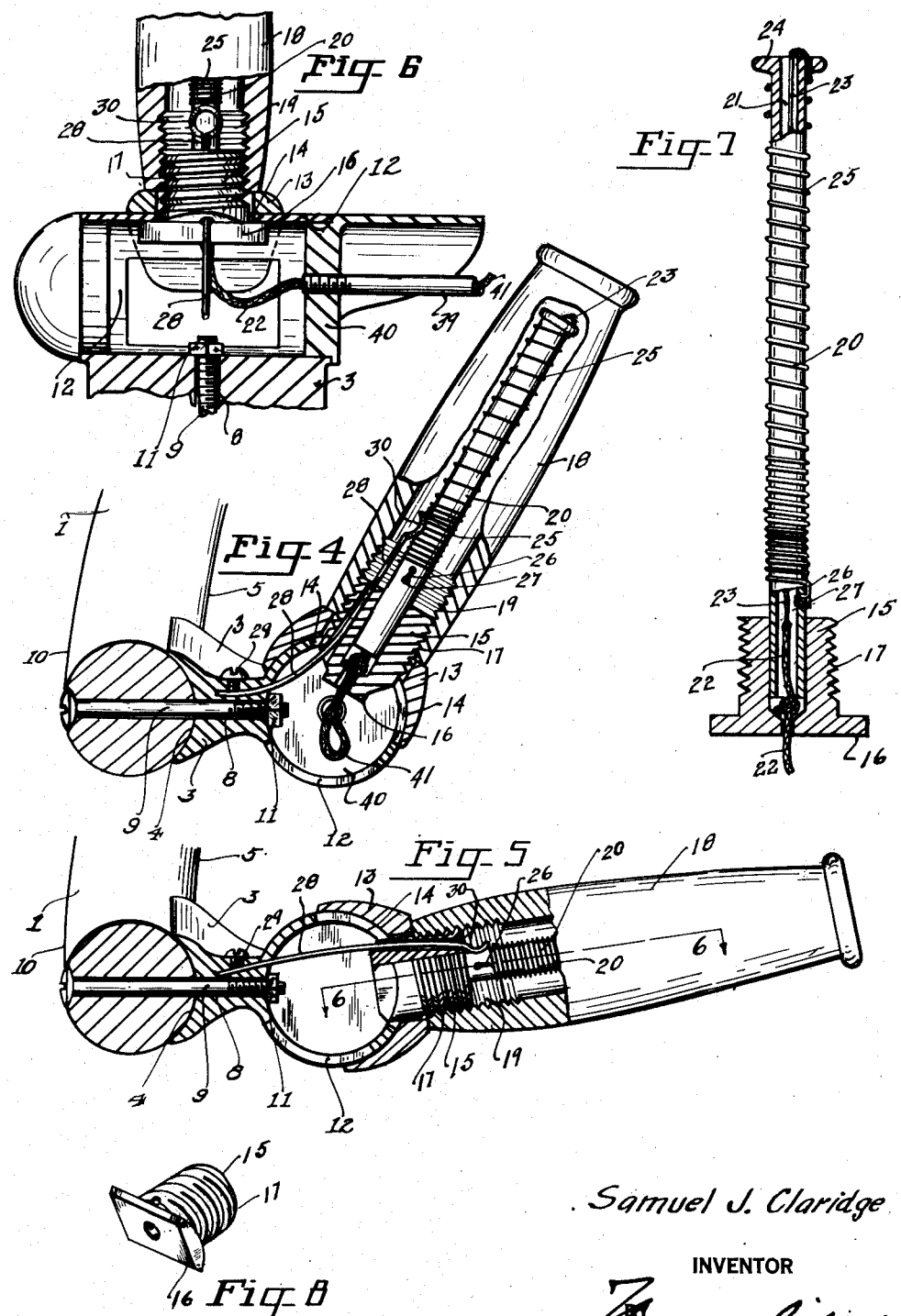
Samuel J. Claridge
INVENTOR
ATTORNEY Patented July 5, 1932

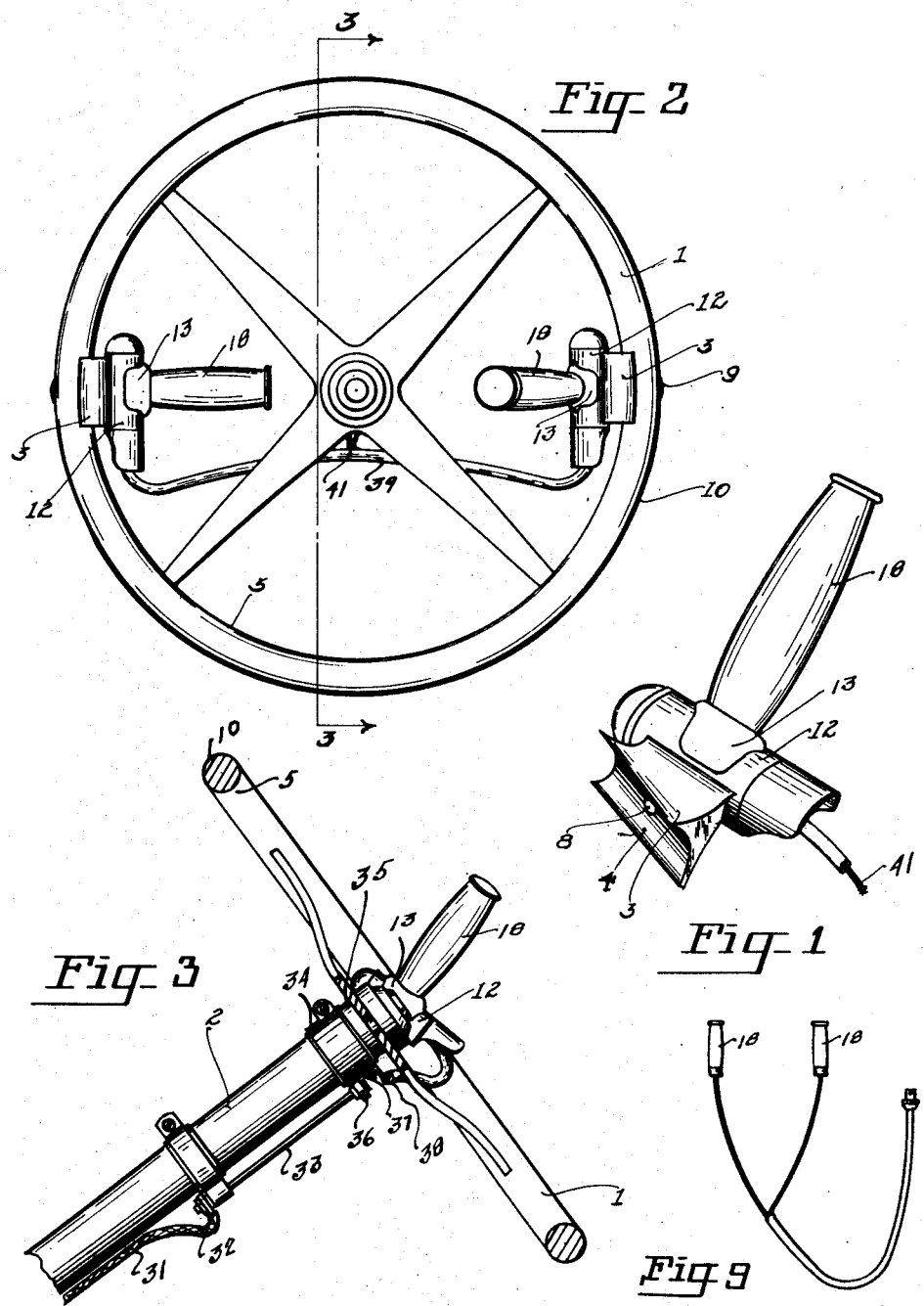

1,865,834

UNITED STATES PATENT OFFICE

SAMUEL J. CLARIDGE, OF PORTLAND, OREGON

ELECTRICALLY HEATED HANDLE FOR VEHICLES AND OTHER PURPOSES

Application filed April 19, 1930. Serial No. 445,802.

This application is a continuation in part of my earlier patent application Serial No. 297,731, filed in the United States Patent Office on August 6, 1928.

My invention is primarily adapted for placement upon automotive steering wheels. I do not wish to be limited to the use of my device for placement upon steering wheels as the handles in units or in pairs may be used for other purposes with equal facility. The device consists primarily of handle elements primarily intended for attachment upon the rim of the steering wheel, the handle elements being adjustably attachable to the support disposed upon the steering wheel with means for conducting electric current to the interior of each of the handle elements. An electric heating device is disposed longitudinally of the handle element and adapted for being heated electrically.

Means are further provided for regulating the amount of heat that will be developed within the heating device determinable by the position of the handle structure.

Means are further provided for entirely cutting off the electric current when the handle is placed in a predetermined position.

The primary object of my invention is to provide handles that may be placed upon the steering wheel of a vehicle that may be grasped by the hand of the operator of the vehicle to thereby provide optional driving positions for the arms and hands of the operator of the vehicle.

A still further object of my invention consists in providing adjustable driving handles for vehicles that are adapted for placement upon the steering wheel of the vehicle that may be warmed, or heated to the desired temperature by the simple adjustment of the driving handles themselves.

A still further object of my invention consists in providing driving handles that may be warmed, or used unwarmed, at the option of the user of the same.

A still further object of my invention consists in providing a driving handle that may be inclined at an angle to the vertical to accommodate the driving handle to the most desirable position required by the individual user.

Still further objects of my invention consist in providing a handle that may be used for the warming of the hands of the user, or for warming other parts of the body of the user independently of the device being used as driving handles, and to provide simple adjustment means for predetermining the temperature of the handle to be warmed.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a perspective side view of one of the driving handles and the supporting base therefor.

Fig. 2 is a plan view of a steering wheel illustrating a pair of my new and improved handles in placement thereupon.

Fig. 3 is a sectional, side view of the mechanism illustrated in Fig. 2, the same being taken on line 3—3 of Fig. 2 looking in the direction indicated.

Fig. 4 is a sectional, side view of the handle, the supporting base therefor illustrating the same as being secured and in place upon a steering wheel.

Fig. 5 is a cross section view of the steering handle as having been positioned to entirely shut off or open the electric circuit disposed within the warming element within the driving handle.

Fig. 6 is a fragmentary, sectional view of the mechanism illustrated in Fig. 5, the same being taken on line 6—6 of Fig. 5 looking in the direction indicated.

Fig. 7 is a side view, partially in section, of the heating element adapted for placement within the steering handle, the same being shown removed from the steering handle.

Fig. 8 is a perspective side view of the plug to which the handle is directly attached.

Fig. 9 is a diagrammatical layout of a pair of my new and improved handles, shown attached to a source of electric energy and in position for use independently of a steering wheel.

Like reference characters refer to like parts throughout the several views.

1 is the steering wheel of any suitable make attachable to a steering column 2. A wheel engaging element 3 is adaptable for placement upon the steering wheel. An annular recess 4 is disposed upon the wheel engaging side of the support 3, the curvature of which is adaptable for precisely meeting the curved surface of the inner side 5 of the steering wheel 1.

I preferably attach the element 3 at a slightly diagonal position to the barrel 12 in order that the handle attachments to be secured thereto may be inclined at the desired angle from the vertical relative to the normal position of the steering wheel. An opening 8 is disposed central of the element 7 through which any suitable fastening means, as a machine screw 9 may be made to pass. I preferably use a countersunk screw in order that the countersunk head may be inserted within the outer rim 10 of the wheel. A nut 11 is placeable upon the inner end of the machine screw and within the barrel head 12, of the base, of the device which may be tightened through the under slot of the barrel.

The barrel head 12 of the base is made circular upon its outer surface to which the fitting 13 may be made to engage. A hole 14 is disposed off center and through the outer surface of the barrel 12. The plug 15 has an elongated head 16 disposed upon its inner side to engage the inner surface of the barrel 12. The plug 15 is threaded upon its outer periphery, as illustrated at 17, and the handle 18 is threaded upon its inner surface 19 to facilitate threaded engagement between the plug 15 and the handle. The loosening of the handle, relative to the plug, permits of a partial rotation of the plug and the handle relative to the barrel 12 and when positioned to the desired placement, the handle is then turned until the same is tightened relative to the plug which locks the same upon the barrel 12. A heated core 20 made of any suitable material, as porcelain, is placeable within the plug 15 and is fixedly positioned therein, as by being cemented thereto. The heater 20, has an opening 21 running longitudinally thereof through which an electric conductor 22 is made to run. The electric conductor is attachable to any source of electric energy as a storage battery, not here shown. A resistance wire 23 may be attached at one end to plug 15, which assures constant contact or ground; or it may be attached independently to the core of the heater 20, in which event the contact or ground with plug 15 is made by the resilient contactor 28, but whether the resistant wire 23 is grounded at one point, or the other, it is wound from hence about the heater core 20 for the length desired and attached to the electric conductor 22 which runs longitudinally through the center of the heater core to the source of energy. The pitch of the winding disposed about the heater may be made of any suitable spacing. The free end 26 of the resistance wire is made fast to the core by any suitable fastening means as by being threaded through openings 27 passing through the side wall of the heater.

A resilient contactor 28 is secured to the metal terminal, here shown as the wheel engaging element, the same being secured to the wheel engaging element by any suitable fastening means as by a screw 29. The resilient contactor 28 has a curved end 30 that is made to engage upon and contact with the resistance wire. The position of the contacting end 30 with the wire determines the length of resistance wire that the electric current will pass through and therefore determines the amount of heat that will be developed within the handle. The location and position of the handle arms determines the point at which the contact point 30 will engage upon the resistance wire. By the turning of the handle down as illustrated in Fig. 9 the resilient contactor 28 is made to disengage from the resistance wire and therefore the heat within the handle will be entirely eliminated because the circuit is broken through which the electricity is intended to pass to heat the same. The electric current from the battery flows through the conductor 31 and the same is secured to a terminal 32 disposed upon the lower end of the shaft 33. An electric terminal 34 is disposed about the lower end of the hub 35 of the steering wheel and a contacting wheel 36, rotatably disposed upon the shaft 33, is made to engage directly upon the hub 34 and to roll thereupon as the steering wheel is rotated, or partially rotated, to thereby conduct the electricity through the shaft 33, the wheel 36 and into the hub 34. An electric terminal 37 is disposed upon the hub 35 to which the electric conductor 38 is attached upon one end. A conductor pipe 39 terminates upon each end within the wall 40 of the cylinder. The pipe being secured thereto by any suitable manner as by being threaded into the wall 40. The electric conductor 41 passes through the pipe and is secured upon its entrance end to the resistance wire disposed within the handle structure. The pipe 39 should be made sufficiently strong to protect the electric conductors passing therethrough into the respective handle elements that are preferable mounted upon the oppositely disposed sides of the steering wheel. Either one of the handles may be heated independently of the other and each of the handles may be positioned independently of the other. The intensity of the heat developed within each handle is predeterminable by the position of the handle relative to the wheel engaging element to which the same is adjustably attached.

I do not wish to be limited to the use of my handle structures to steering wheels as the same may be used for any warming purpose. The same may be attached to any suitable source of electric current. The handles may be used singly, or in pairs. The handles may be used as warming elements with equal facility by other occupants of the vehicle, as well as by the driver, if arranged singly, or in pairs, and so arranged that they may be attached to any electric outlet to which the electric terminals may be attached.

I also do not wish to be limited in the use of my control for predetermining the amount of resistance wire that the current will flow through, as the control may be used for other purposes to predetermine the amount of length of resistance wire that the current will normally flow through, and therefore the heat that will be developed by the resistance wire within the device to be heated.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a steering wheel, wheel engaging elements adapted for attachment to the rim of the steering wheel, means for attaching the wheel engaging element to the steering wheel, a handle element rotatably disposed and mounted upon the wheel engaging element, a plug having a head disposed upon one end adjustably positioned within the wheel engaging element, a hollow handle threadably attachable to the plug, a core disposed longitudinally of the handle, resistance wire disposed about the core, the said resistance wire being secured upon its one end to an electric conductor and a resilient contactor having a curved end adapted to ride upon and engage with the resistance wire and to conduct electricity therefrom, and means for predetermining the length of the resistance wire that will conduct electricity determinable upon the position of the handle element relative to the wheel engaging element.

2. In a device of the class described, the combination of a steering wheel, a steering column depending from the steering wheel, wheel engaging elements detachably attachable to the rim of the steering wheel, handle elements rotatably disposed and mounted upon the wheel engaging elements, means for lockably positioning the handles relative to the wheel engaging elements, a core disposed longitudinally of the handle elements, resistance wire disposed about the core, means for conducting electric current through the resistance wire, and means for predetermining the length of the resistance wire through which electric current is to be conducted.

3. In a device of the class described, in combination with a steering wheel, of handle elements, means for adjustably securing the handle elements relative to the steering wheel, a core disposed longitudinally of the handle elements adapted for being heated electrically and means for predetermining the heat to be developed within the core depending upon the position of the handle relative to the supporting wheel.

4. In a device of the class described, in combination with a steering wheel and a steering column to which the steering wheel is attached adjustable steering handles disposed upon the steering wheel, means for conducting electricity from the steering column to the steering handles, and means for predetermining the heat to be developed within the steering handles depending upon the position of the steering handle relative to the steering wheel.

5. In a device of the class described, in combination with a steering wheel of one or more steering handles adapted for being electrically heated adjustably securable to the steering wheel and means for determining the heat to be developed within the handle predeterminable upon the position of the handle relative to that of the steering wheel.

6. In a device of the class described, the combination with a steering wheel, warming handles positioned upon the steering wheel, a core longitudinally disposed within each of the handles, each of said cores comprising a resistance wire adapted for being electrically heated and wound about its respective core body, the ground end of each of the wires being independently attached to its respective core body, an element disposed within each of the handles and positionable upon the respective resistance wire, the position of this element relative to the wire being determinable by the position of the handle, and means for conducting electric current through each of the resistance wires.

SAMUEL J. CLARIDGE.